United States Patent [19]

Mintz et al.

[11] Patent Number: 4,661,226
[45] Date of Patent: Apr. 28, 1987

[54] SEPARATION OF DISPERSED PHASE FROM PHASE MIXTURE

[75] Inventors: Donald J. Mintz, Summit; Arnold J. Kelly, Princeton Junction; Anthony M. Gleason, Westfield, all of N.J.

[73] Assignee: Exxon Research and Engineering Company, Florham Park, N.J.

[21] Appl. No.: 601,254

[22] Filed: Apr. 17, 1984

[51] Int. Cl.[4] .............................................. B01D 17/06
[52] U.S. Cl. .................................. 204/186; 204/188;
204/302; 210/748; 210/97; 210/195.1; 361/228
[58] Field of Search ............... 204/186, 188, 302, 306;
55/10, 107; 210/744, 748, 97, 104, 109, 195.1,
197, 243; 361/228; 239/704

[56] References Cited

U.S. PATENT DOCUMENTS

| | | | |
|---|---|---|---|
| 2,385,903 | 10/1945 | Winkelmann | 210/748 |
| 3,412,002 | 11/1968 | Hubby | 204/186 |
| 3,489,669 | 1/1970 | Ruhnke | 204/302 |
| 3,567,619 | 3/1971 | Brown | 204/302 |
| 3,616,460 | 10/1971 | Watson et al. | 204/188 |
| 3,701,723 | 10/1972 | Cole et al. | 204/188 |
| 3,802,625 | 4/1974 | Buser et al. | 239/704 |
| 4,066,526 | 1/1978 | Yeh | 204/302 |
| 4,193,774 | 3/1980 | Pilat | 55/107 |
| 4,255,777 | 3/1981 | Kelly | 361/228 |
| 4,341,617 | 7/1982 | King | 204/302 |
| 4,358,379 | 11/1982 | Inoue | 210/748 |
| 4,435,261 | 3/1984 | Mintz et al. | 204/168 |
| 4,469,582 | 9/1984 | Sublette et al. | 204/302 |

OTHER PUBLICATIONS

Jorgensen & Will, Rev. Sci. Inst., 33, 55 (1962).
Steutzer, Rev. of Sci. Inst., 33, 1171 (1962).
Pohl & Schwer, J. Electrochemical Soc., 107, 383 (1960).

Primary Examiner—Peter Hruskoci

[57] ABSTRACT

In order to separate the dispersed phase from a continuous background fluid phase together forming a phase mixture (for example, contaminant particles from a continuous liquid phase), charge is injected into the mixture with a charge injection device (1) which issues charged mixture into a separation vessel (6) through a gas or vapor space (11). The injected charge induces an electric field within the liquid mixture in the vessel (6) which causes migration of contaminants towards the walls of the vessel (6) and precipitation on the wall surfaces. The clarified liquid is discharged from the vessel through outlet (7).

The contaminant separation technique is effective and simple to achieve technically, and has the added advantage of operating effectively even with extremely small contaminant particle sizes, for example of the order of sub-micron or micron size.

28 Claims, 3 Drawing Figures

SEPARATION OF DISPERSED PHASE FROM PHASE MIXTURE

BACKGROUND OF THE INVENTION

This invention relates to a method and apparatus for use in the separation of a dispersed contaminant phase from a phase mixture comprising the contaminant phase dispersed in a continuous fluid phase. The contaminant phase may be a solid, liquid, gel or gas or any combination of these. Examples of contaminants ae carbonaceous soldis, metal and metals oxides (e.g., alumina fines), composites, water droplets, polymer chains and precipitates (such as wax crystals, asphaltenes, hot filtration sediment, and high molecular weight polar compounds). "Fluid phase" is used to indicate that the continuous background phase may be either a liquid or gas, liquid being the more usual. Examples of the application of this invention are the removal of particulate material, such as wax crystals, from a liquid stream or dispersed water droplets from lube stocks and other oils. Further possible applications of the invention are emulsion breakage, dehazing fuel oil, removal of fine particles from refinery process streams, particulate separation in coal liquefaction and oil shale processes, and removal of coagulated metal-rich fractions from residua.

DESCRIPTION OF THE PRIOR ART

Electrostatic separation techniques are known involving the application of an electrostatic field. For example, in U.S. Pat. No. 2,108,158 (Fisher), agglomeration of water from a water-in-oil emulsion takes place due to the action of a high field gradient existing near a pointed electrode. The field induces fluid motion which transports the water particles to a distinct water layer on which the emulsion is floating.

U.S. Pat. No. 1,940,654 (Stanton) discloses a petroleum dewaxing technique based on electrophoresis. Two possible mechanisms are described by which the technique imparts charge to the wax crystals, i.e. direct contact charging and charging by passing the crystals through a glow or brush discharge (comprising bipolar gas-phase ions).

In U.S. Pat. No. 1,838,929 (Fisher) a method which appears to operate on the principle of dielectrophoresis, is described to cause water droplets to coalesce between two electrodes. Flanges on a central electrode cause a high field gradient to exist at their edges and they are claimed to accelerate the treating action. The central electrode is conically-shaped to produce a more rapid fluid flow in the lower extremity of the treating apparatus.

Similar space-charge field precipitation methods are disclosed in U.S. Pat. Nos. 3,129,157 (Loeckenhoff) and 3,489,669 (Ruhnke) in which a particle-laden liquid is passed through a corona point ioniser so that the particles become charged and the charged particles are collected on the inner wall surfaces of a dielectric conduit located downstream of the ionizer.

It is also known from U.S. Pat. No. 3,412,002 (Hubby) to break water-in-oil emulsions electrophoretically by charging the water particles in a stream of the emulsion by physical contact with a high voltage electrode and deflecting the charged droplets laterally with respect to the stream by a transverse magnetic field.

U.S. Pat. No. 4,341,617 (King) uses sharply pointed electrodes, in an electrostatic treater for waste liquid, to concentrate the electric field at the electrode tips for encouraging flocculation of impurity particles carried by the waste liquid.

Finally U.S. Pat. No. 3,314,872 (Waterman) discloses causing a triboelectrically charged fluid to impinge on and transfer its charge to an electrode. This causes an electric field to be set up between this electrode and a further electrode, between which the contaminant-laden stream flows. The electric field separates the contaminants in the same way as conventional electric treaters.

Known separation techniques have been found to operate quite satisfactorily in practice, but have the disadvantage that they are not particularly effective in the case of contaminant bubble, droplet or particle sizes below a certain level (especially of the order of submicron-size or micron-size diameter—for example about 0.1 to 100 microns). This may be due to the fact that the electrostatic force acting on each individual particle due the applied electric field becomes insufficient, when the particle size becomes sufficiently small, having regard to the viscous drag forces exerted by the continous background phase and the rate of leakage of charge from the individual particles.

SUMMARY OF THE INVENTION

The method of this invention, in general, relates to the separation of a dispersed (i.e. discontinuous, immiscible) phase from a continuous background fluid phase together forming a phase mixture. The method involves essentially two steps. In the first step, free charge that is net unipolar is introduced into the mixture to bring about migration of dispersed phase (such as in the form of bubbles, particles or droplets) under the influence of an interaction which occurs between the electric field, which is self-induced in the mixture itself, and the charge on the dispersed phase, which are both brought about by the introduced free charge. Free charge is positive or negative ions which, initially, are free to move through the continuous background phase. The second step involves allowing the migrating dispersed phase to form into accumulations of charged dispersed phase on a collector surface in contact with the phase mixture. The migration effect is brought about, substantially due to the introduced free charge as will be explained below.

It is stressed that the electric field is the result not of voltage applied to any electrodes, but rather arises from the total introduced or injected charge distribution in the fluid and on the contaminants and separation vessel wall surface regions where separation occurs.

A particularly convenient way of recovering the contaminant is to allow the migrating dispersed phase to form accumulations of charged dispersed phase on a wall surface forming a boundary of the mixture. The wall surface can typically be the inner wall surface of a vessel containing the phase mixture being treated.

The basis for the effective separation that can be achieved when putting this invention into effect is believed by the inventors to be as follows. For simplicity, the following description applies to the case where the continuous background phase is a liquid, but the differences where it is a gas are discussed briefly later. The first step in the process is the production of an excess (i.e. net unipolar— positive or negative) charge density in the otherwise electrically-neutral multiphase fluid mixture. Several techniques are available to produce a transient or steady-excess charge density. Broadly speaking, such methods fall into two general categories, namely: (1) injection of excess charge across the interface or boundary which confines the contaminant-/background phase mixture, and (2) volumetric charge introduction techniques into the bulk of the fluid mixture. Examples of the first category include electron beam and high energy particle radiation, photoemission and charge transport by a moving fluid. Reference is hereby directed to U.S. Pat. No. 4,255,777 in the name Arnold J. Kelly, assigned to the present assignees, the contents which are expressly incorporated herein, for a description of one example of how charge injection can be achieved, in this case predominantly or solely by field emission. Electron beam, photoemission and field emission are all examples of electron emission. Examples of the second category are photoionization of either or both of the contaminant and background phases and secondary ionization by thermalization of high energy particle irradiation of the phase mixture. These examples all involve ionic dissociation within the fluid mixture.

It is necessary that there be an excess of free charge in the sense of a sufficient abundance that an effective migration of contaminant will occur. The charge introduced into any stream to be decontaminated must be net negative or net positive. However, providing this requirement is met, then it is equally possible to introduce the excess charge using two streams of opposite but unequal levels of charge or alternating net positive and net negative streams for the purposes of agglomeration prior to collection, in the first case, or multilayer precipitation in the second case (e.g., collecting a net negative layer then a net positive layer, and so forth, of dispersed phase).

The second step in the process is the transference of the major portion of the excess charge to the contaminants in the liquid. In a preferred way of performing the invention in while a charge injector, such as disclosed in the aforesaid U.S. Pat. No. 4,255,777, is used for introducing net unipolar free excess charge into a contaminant-laden stream, the stream issues from the charge injector as a continuous stream or spray through a gas or vapor space, usually an air space, and enters a separation vessel where a body of charged liquid is collected. The gas or vapor space is provided to enable the charged fluid to exit the charge injector with high velocity to efficiently sweep out the injected charge and also to eliminate any charge dissipation path back to the charge injector. Such decoupling of the separation vessel from the charge injector is important for achieving a high level and high effeciency of charge injection. It is of no particular importance of the effective removal of contaminant whether the contaminated liquid is sprayed by the charge injector or simply issues as a continuous stream into the separation vessel, particularly at relatively high velocity throughputs in the charge injector. However, when the contaminated liquid is sprayed, the individual liquid droplets are in general separated from one another and this can be important where lower throughput velocities, closer to the drift velocity of the individual charges, are employed. It is, however, remarked that it is necessary that there be no contact between the spray and stream passing through the gas or vapor space and the surrounding separation vessel wall, in order to avoid charge dissipation. Where the continuous background phase is a gas, this can be achieved by introducing a secondary gas flow which provides an inner annular protective sheath on the surrounding wall surfaces. Suitably, the gas or vapor space can be provided by the ambient atmosphere separating the charge injector from the separation vessel, or it can be enclosed and a purge gas, e.g., nitrogen, circulated through the space to avoid any risk of explosion or chemical reaction. In addition, the purge gas helps to obtain uniform separation results irrespective of changes in ambient conditions, especially humidity, which can affect the rate of depletion of charge where an air space is present. In the absence of any such gap, reduced separation efficiencies will result. According to a development, the gas or vapor space is pressurized which can maintain a satisfactory throughput rate in the separation vessel even for rather viscous liquids and can increase the throughput rate for less viscous liquids. In the separation region, it is assumed that the excess charge density exceeds the liquid background charge density (i.e. the density of bipolar charge carriers which are intrinsic to the liquid and which result in the conductivity of the liquid); then the induced electric field in the separation region caused by the excess charge density will act on the individual charge carriers and drive them to the boundaries of the liquid mixture. Some of the charge will be intercepted by the individual contaminants of the contaminant dispersion and the contaminants will thereby become charged. The interaction which then occurs between the charged contaminants and the induced electric field causes the contaminants to migrate towards the boundaries of the liquid mixture.

The next part in the process involves the accumulation of the migrating contaminants on the collector surfaces provided by the wall of the separation vessel. The charged contaminants will congregate on the vessel walls and form into accumulations by interaction between the individual contaminants. This will manifest itself in the form of agglomeration, and in some cases coalescence too, for gaseous and liquid contaminants or merely build-up or deposition in the case of solids, e.g., wax crystals, and gels.

Finally, accumulated contaminant and the clarified background phase need to be removed or separated from one another. For liquid contaminants this may entail settling (or flotation, depending upon the density of the contaminant phase relative to that of the liquid) of the re-entrained liquid contaminants, to form a distinct continuous contaminant phase, to enable separation of the two liquid phases. Other separation techniques which are well known in the art, for example centrifuging, can be used instead. Alternatively, the microscopic liquid contaminant droplets may merely congregate on the vessel walls without any appreciable droplet size growth or settling, leaving clarified liquid in the bulk of the separation vessel interior which can then be discharged. Both effects may occur at the same time. Where the contaminant is a gas, the bubbles may merely congregate on the inner wall surfaces of the separation vessel and/or they may coalesce and eventually grow to a size where they become released, due to factors such as buoyancy, from the collector surfaces and can be allowed merely to rise to the surface of the background liquid phase and be collected there as a foam or allowed to escape into the atmosphere. The liquid remaining in the separation vessel is therefore clarified and can be separated or discharged from the separation vessel. Where the contaminant is a solid, periodic cleaning of the collector surfaces by backflushing, solvent, washing, heating, and other techniques which are well-known to those in the art can be used.

It will be appreciated that the viscosity and conductivity of the background phase need to be sufficiently low such that the contaminant can reach the vessel walls before any appreciable leakage or depletion of its charge can take place such as would diminish to an ineffective level the electrical migration force acting on the contaminant. Typically the product of the vicosity and conductivity of the continuous liquid phase would be less than $10^{-7}$ centipoise/ohm-meter, but this is not to be regarded as limitative in any way.

It is to be noted that when using a charge injector to introduce the net unipolar free charge, it is important that the stream velocity through the charge injector is high enough to transport the charged stream away from the electrode region of the charge injector. Ideally, the stream velocity needs to exceed the drift velocity of the individual charges relative to the liquid induced by the electric field produced by the charge injector electrodes. On the other hand, the liquid in the separation vessel needs to remain there long enough to enable contaminant migration to the vessel walls. This generally requires a much lower velocity throughput in the separation vessel than in the charge injector. Typical valves for the thoughput velocities in the charge injector and separation vessel are 1 m/sec and 1 cm/sec, respectively. In another embodiment its internal cross-sectional diameters of the separation vessel and the injector orifice diameter are for example 10 cms and 0.025 cms, respectively. These are purely exemplary and have no limiting character.

According to another feature, then, of the invention there is provided a method of separating a dispersed phase from a continuous fluid phase, the phases together forming a phase mixture. The method includes flowing the phase mixture past a pointed high potential electrode at sufficient velocity that charge that is net unipolar is injected into the liquid mixture. The charged liquid mixture issues as a jet or stream through a gas or vapor space into a separation vessel such that the introduced free charge causes an electric field to be induced in the mixture in the vessel and the dispersed phase there to be charged such that the interaction between the induced electric field and the charged dispersed phase causes migration of dispersed phase through the phase mixture towards the internal wall surfaces of the vessel. The liquid mixture is maintained in the vessel for sufficient time for dispersed phase to migrate to said internal wall surfaces and separate out from the continuous fluid phase on those wall surfaces.

Where the continuous phase is a liquid, the phase mixture, in one arrangement, may be continuously recycled back from the separation vessel and past the pointed high potential electrode. In another arrangement, the separation vessel is periodically at least partially emptied of clarified liquid phase. Alternatively, the level of the body of liquid in the separation vessel can automatically be maintained substantially constant. This can be achieved by regulating the rate of supply of phase mixture to be treated to the charge introduction means in dependence upon the detected level of liquid in the separation vessel.

The apparatus of this invention comprises, essentially, means arranged to introduce free charge that is net unipolar into the phase mixture and a vessel for receiving and containing phase mixture that has been charged by the charge introduction means. The free charge causes both an electric field to be induced in the mixture and the dispersed phase to be charged such that the interaction between the induced electric field and the charged dispersed phase causes migration of dispersed phase towards the inner wall surfaces of the vessel. The migrating dispersed phase forms into accumualtions of charged dispersed phase on these inner surface.

The apparatus, in another aspect, comprises in addition to the charge introduction means, a collector surface disposed in contact with the liquid mixture in the path of the migrating dispersed phase so that the accumulation of the migrating dispersed phase takes place on that collector surface.

When putting the invention into effect, either "batch" or "continuous" clarification of the continuous bckground phase can be effected. In batch treatment, the phase mixture to be treated in suitably introduced into a separation vessel, after having free charge introduced into the phase mixture, and the accumulations of contaminant phase are recovered in any suitable way, such as described above. Afterwards, the clarified continuous phase is discharged from the separation vessel and then the next batch introduced into the separation vessel for treatment. In a modified form of batch treatment, the phase mixture is continuously recycled through the charge introduction stage followed by the separation vessel and then back to the charge introduction means, until the required level of clarification of the continuous phase is achieved. In the "continuous" recovery process, the liquid mixture is continuously recycled through the charge introduction region followed by the treatment vessel, so as to enhance the overall dispersed phase separation effectiveness. Suitably, the charge introduction means (e.g. charge injector) is located above the vessel.

According to another aspect of the invention there is provided apparatus for use in separating a dispersed phase from a continuous fluid phase, the phases together forming a phase mixture. The apparatus comprises an electrostatic charge injector including a pointed high potential electrode, means for flowing said phase mixture past said electrode at sufficient velocity that charge that is net unipolar is injected into the liquid mixture, a separation vessel into which the charge injector is arranged to issue the charged liquid mixture as a stream or spray through a gas or vapor space between the charge injector and separation vesel, whereby the introduced free charge causes an electric field to be induced in the mixture in the vessel and the dispersed phase there to be charged such that the interaction between the induced electric field and the charged dispersed phase causes migration of dispersed phase through the phase mixture towards the internal wall surfaces of the vessel, and means operable or operative to maintain the liquid mixture in the vessel for sufficient time for dispersed phase to migrate to said internal wall surfaces and separate out from the continuous fluid phase on those wall surfaces.

Where the continuous phase is a liquid, in a preferred arrangement an outlet in the separation vessel is connected to the charge introducing means through a pump for recycling mixture from the vessel back through the charge introducing means.

In another arrangement, the vessel is provided with valve means with are operable for at least partially emptying the vessel of clarified liquid phase.

Alternatively, the vessel may be provided with means responsive to the level of the body of liquid in the separation vessel for maintaining said level substantially constant, for example by regulating the rate of supply of phase mixture to be treated to the charge introducing means according to the monitored level of said liquid mixture.

Where the continuous background phase is a gas, essentially similar considerations will apply. However, the volume throughput in the separation vessel will be considerably higher and this will necessitate a much longer separation vessel and/or a much wider separation vessel. In addition, the flow path for the phase mixture between the charge introducing means and the separation vessel will need to be fully enclosed.

With the present invention, it is possible to provide an apparatus and method for the effective separation of dispersed phase from a continuous fluid phase, especially where the mean contaminant size is very small (e.g. of the order of 0.1 to 100 microns in diameter).

The contaminant separation apparatus can be made to be simple in construction and reliable in operation, whilst a contaminant separation method can be provided which is simple to put into effect. With the invention, it is possible to attain a high level of purity of the clarified continuous phase.

It will be appreciated that the invention is not limited to separating a single contaminant from the mixture. Two or more contaminant species may be separated, providing each of them forms, or the contaminant phases are combined to form, a dispersed phase within the background fluid phase.

BRIEF DESCRIPTION OF THE DRAWINGS

The foregoing and other advantages and benefits of the invention will become apparent from the following description given, by way of example, with reference to the accompanying single drawing, in which.

In the Figures, the same references denote the same or corresponding parts.

DESCRIPTION OF THE PREFERRED EMBODIMENTS

The apparatus to be described is designed for treatment of a liquid containing solid particles (contaminant). The contaminated liquid is introduced into the inlet of a charge injector which injects free charge (net positive or negative) into the mixture predominately by field emission. However, it is to be understood that two streams of opposite charge or alternating net positive and net negative streams may be used instead for the purposes of agglomeration prior to collection (in the first case) or multilayer precipitation (in the second case—e.g. collecting a net negative layer then a net positive layer, and so forth, of dispersed phase).

Figure 1:
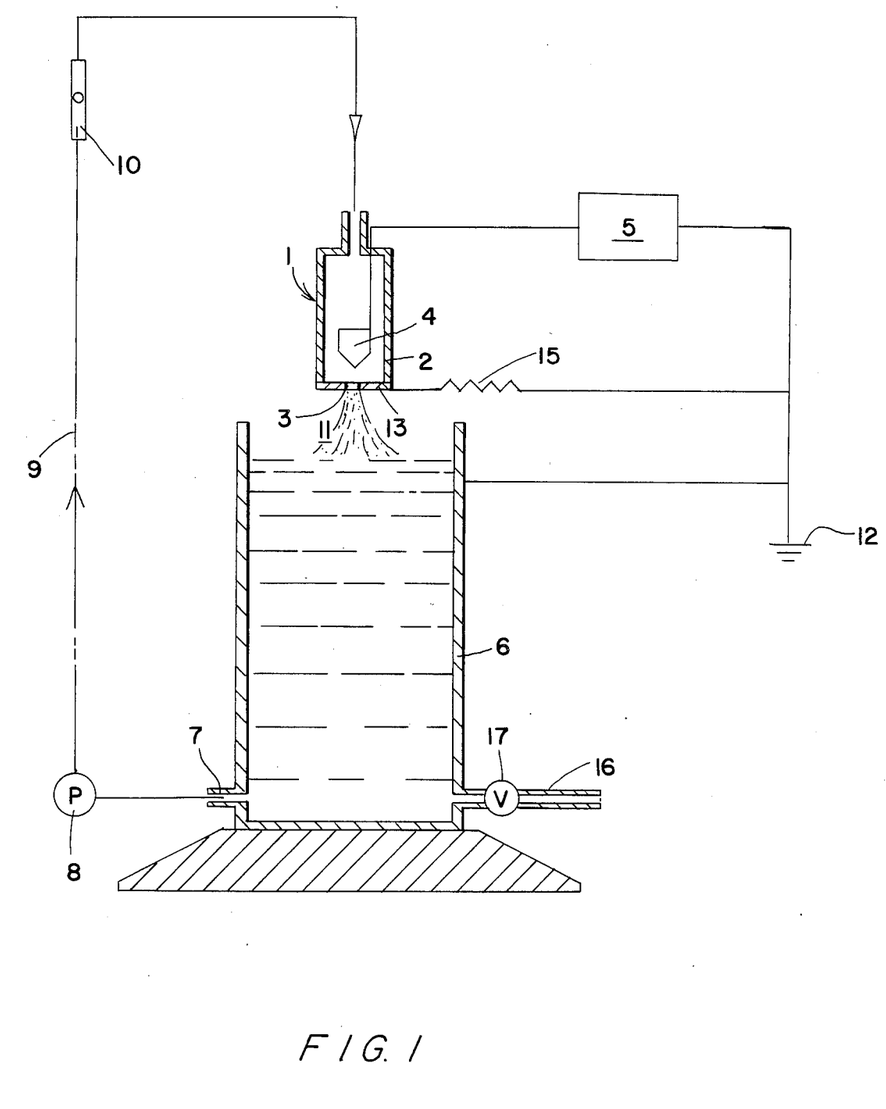
FIG. 1 shows, diagrammatically, a vertical section through one form of contaminant separation apparatus in accordance with the invention, adapted for the removal of particulate contaminant from a liquid stream, employing recycling of a batch sample.

Suitably, the charge injector 1 is constructed in accordance with the teaching of the aforesaid U.S. Pat. No. 4,255,777, to which reference is made for a more complete disclosure of the construction and operation of the charge injector. However, in substance, such a charge injector, as shown, essentially comprises an upright, suitably cylindrical, chamber 2 through which the mixture passes, having a bottom wall 13, with an orifice or opening 3, at one end and a sharply pointed electrode 4 connected to the high potenial terminal of voltage power supply 5, whose earth terminal is grounded at 12, the tip of the electrode 4 being located closely above, and in axial alignment with, the opening 3. The chamber bottom wall 13 serves as a second electrode which is maintained at a lower voltage, relative to earth, than pointed electrode 4, by means of a connection to earth 12 from the lateral wall of the chamber 2 through a resistance element 15. Charge is injected by the pointed electrode 4 into the mixture issuing through the spray opening 3 and the charged mixture issues or sprays into an electrically conductive, e.g., metallic, vessel or reservoir 6 located below the charge injector 1. Vessel 6 is grounded at 12, so as to complete the electrical circuit of the charge injector. The stream issuing downwardly through opening 3 breaks into a spray at a short distance below the spray opening in air gap 11, depending on the charging potential of the charge injector, but the existence of a spray is not critical to the effective operation of the separation apparatus, as explained above. The separation vessel 6 is provided, close to the bottom thereof, with an outlet pipe 16, including a valve 17, for discharging clarified continuous phase from the separation vessel.

As shown, a liquid outlet 7 is provided in the side wall of vessel 6 at a location well below the level of mixture in the vessel and slightly above the bottom, and this outlet is connected through pump 8 and return line 9 incorporating a flowmeter 10 back to the inlet to the charge injector 1. In this way, liquid is continuously recycled around the liquid circuit and a constant level is maintained in the vessel 6. It is to be noted that because of the very large cross-sectional area of the interior of vessel 6 as compared with that of the stream of charged phase mixture emerging through orifice 3, the stream velocity through the charge injector 1 is relatively high, so as to ensure adequate level of charge injection, whereas the downward velocity of the body of liquid in vessel 6 is very small, so that the migrating contaminant has adequate time to reach the vessel wall surfaces.

In operation, with valve 17 closed, excess charge carriers are induced at or near the sharply pointed end of electrode 4 when this electrode is maintained at a sufficiently high negative potential with respect to bottom wall electrode 13. The charge carriers are then swept from the pointed electrode 4 by the cross flow of contaminated liquid to be clarified issuing through the orifice 3. Migration of the solid contaminant phase takes place within the mixture in vessel 6 towards the walls of the vessel. The contaminant particles are then deposited on the wall surfaces. When the treatment has been completed, valve 17 is opened to empty the clarified liquid from vessel 6, and then a fresh sample can be introduced into the separation vessel for treatment after closing valve 17.

Figure 2:
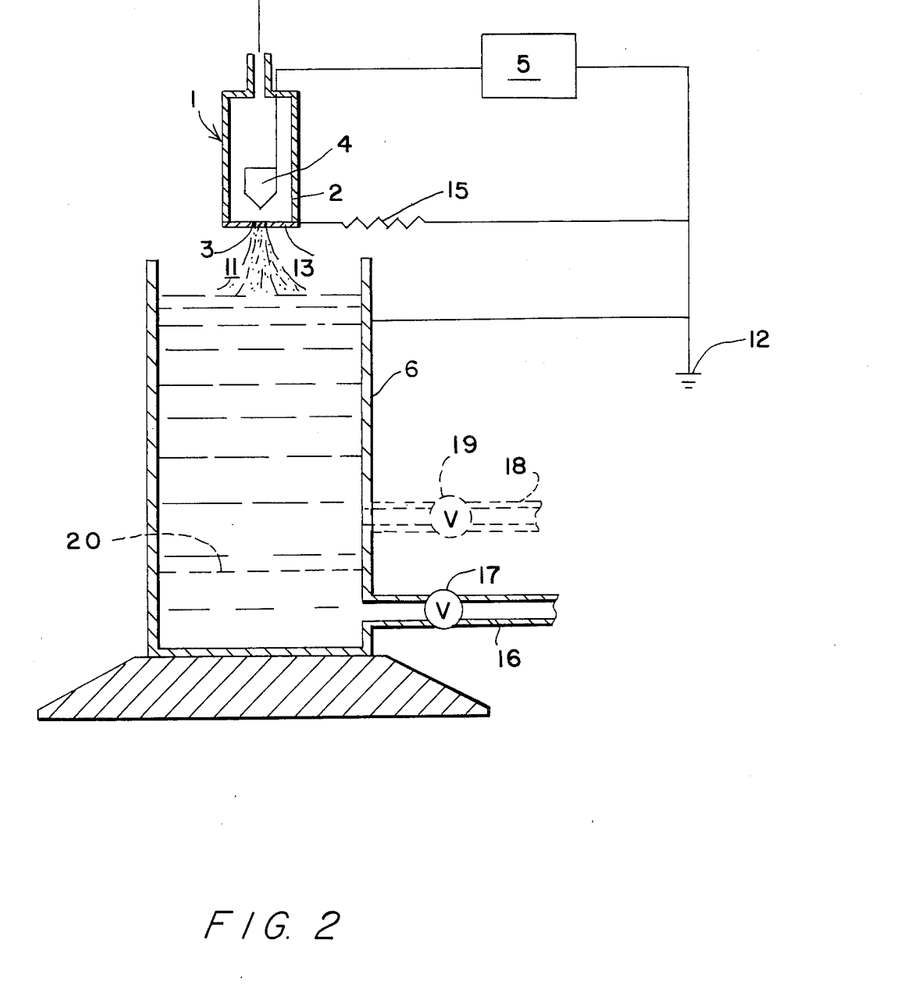
FIG. 2 is a corresponding view of a second embodiment for batch treatment of a contaminated sample.

FIG. 2 is a batch treater. During treatment valve 17 is closed. Starting from an empty separation vessel, the level of the body of liquid in the vessel 6 gradually rises due to the charged liquid issuing into the separation vessel from the charge injector, until the vessel is practically full. Valve 17 is opened to at least partially empty the vessel, the valve then closed, and the next sample for treatment introduced through the charge injector.

FIG. 2 indicates a modification for use with a contaminant that is a liquid in dispersed (droplet) form, where the density of the contaminant phase is greater than that of the background phase. In this case, the body of liquid in the separation vessel will separate into three layers, namely a phase mixture layer in the upper region, and the separated phases below with the lighter phase above the heavier phase. There may be no clear line of demarcation between the layers of contaminated and clarified liquids and the layers may overlap, for example, when clarifying a water-in-oil emulsion. In this case the water droplets collected on the walls of the container vessel may migrate vertically downward towards the bottom of the vessel either by forming a continuous or discontinuous water film or by individual droplets under the influence of gravity. The water on the bottom of the collector vessel may form a second distinct continuous phase or form a layer of clustered droplets. A second outlet pipe 18, incorporating valve 19, is provided at a location in the vessel wall above the interface 20 between the clarified and contaminant phase. In this way these phases can be selectively discharged from the separation vessel.

Figure 3:
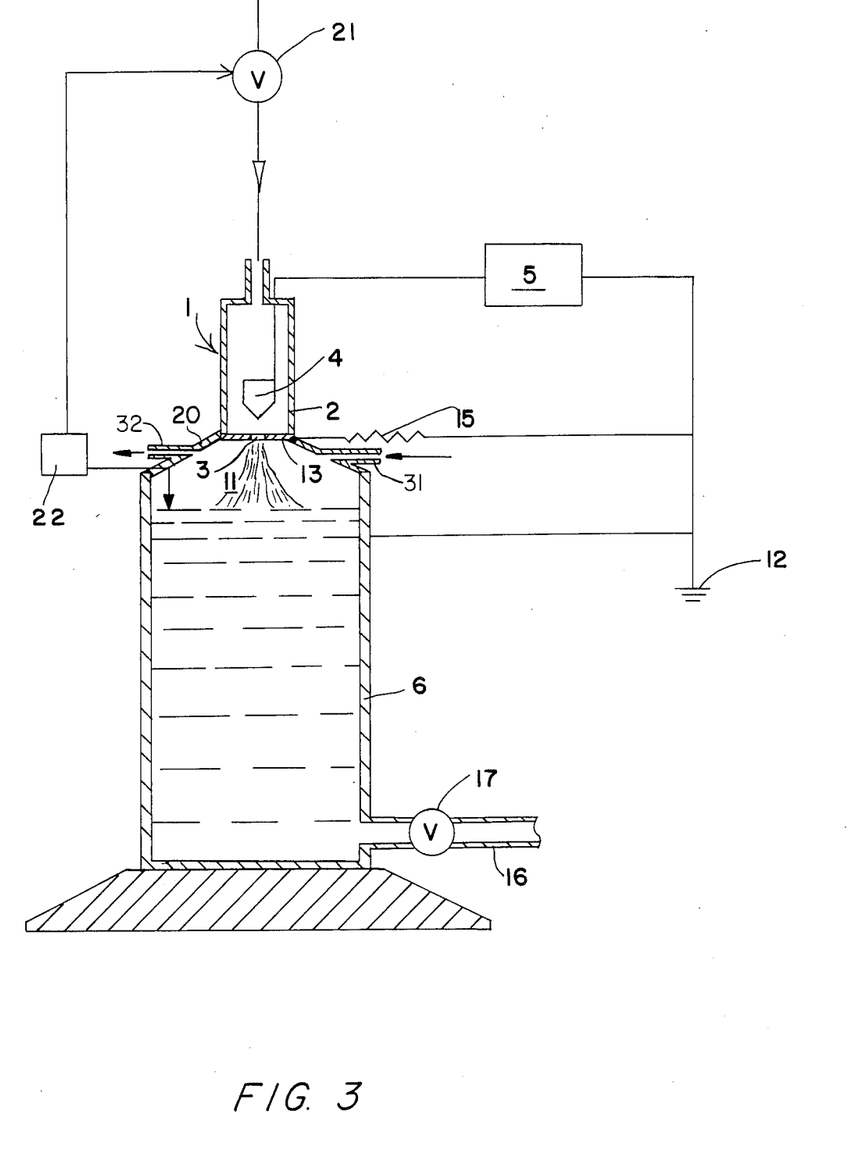
FIG. 3 is a corresponding view of a third embodiment for continuous treatment of contaminated sample.

FIG. 3 shows another form of apparatus for continuous treatment. Here the valve 17 is set so as to allow a particular flow rate through it and a flow regulating valve 21 in the inlet line to the charge injector 1 is controlled automatically by level sensor 22 so as to maintain the body of liquid in separation vessel 6 substantially at a predetermined level.

Another modification of the apparatus of FIG. 1 is shown in FIG. 3. In this modification, the charge injector body is supported on an insulated frusto-conical cap 20 on top of the separation vessel 6 which encloses the gas space 11. Inlet and outlet pipes 31, 32 in the cap can be used for circulating a purge gas through gas space 11 for avoiding any risk of explosion or chemical reaction or humidity-dependent results, all of which might otherwise present a problem in the case of certain liquids to be clarified.

In another development, the enclosed gas space 11 is pressurized from a source of compressed air for example, to increase the throughput rate in the separation vessel which is important where the background fluid is a relatively highly viscous liquid.

The foregoing description will now be illustrated by way of an example.

EXAMPLE

An experiment was run to separate 1$\mu$ carbon black particles from a white oil (Marcol 87—manufactured by Exxon Company USA) using the apparatus of FIG. 1. In order to show the utility of the charge injection process in bringing about solid/liquid separations, a solution of 10 ppm of 1$\mu$ carbon black particles in the white oil Marcol 87 was prepared. This oil has a viscosity of approximately 15 cp at 25° C., the ambient temperature at which the separation was run. Before charge injection was started the solution had a dark grey colour. The clarification of this solution as a function of total electrical energy injected was monitored visually. The degree of clean-up attained was confirmed by microscopic examination. After $5.9 \times 10^{-1}$ J of electrical energy was injected, the solution appeared clear. The carbon black that was in the solution has precipitated out onto the walls of the cylindrical metal vessel. A control experiment was performed in which the 10 ppm carbon black solution was subjected to the same treatment except that the charge injector was inoperative. No precipitation or clarification was observed.

Carbon black was obtained from the Elastomers Technology division of Exxon Chemical Company. A concentrated solution was prepared by adding 0.5 g of carbon black to 155 g of Marcol 87. This mixture was sheared in a Waring blender for one minute at highest speed. The resulting solution has a solids loading of 2900 ppm. 3 g of this concentrated solution was diluted to 1000 ml with Marcol 87 to produce a solution with 9.6 ppm of carbon black. This solution was used in the experimental program. When this solution was sprayed through the charge injector into the metal vessel, the carbon black particles coated out onto the walls of the can. The electrical conditions were 6000 V and 0.2 $\mu$A for seven minutes. The flow rate was approximately 1 ml/sec.

What is claimed is:

1. A method for use in the separation of a dispersed phase from a continuous liquid phase, the phases together forming a phase mixture, by producing migration of dispersed phase within the phase mixture, said method comprising the steps of:
   (a) introducing free charge that is net unipolar into the phase mixture, at least predominantly by electron emission which causes the continuous phase to act as a medium through which volumetric distribution of the introduced charge takes place by charge motion relative to the continuous liquid phase, there being a sufficient excess of free charge introduced such that the volumetric charge distribution causes, in a body of the charged phase mixture, an electric field to be induced in the mixture and the dispersed phase to become charged and the induced electric field and the charge on the dispersed phase interact to produce an electrical driving force acting on the dispersed phase so that said migration is due substantially to said driving force; and
   (b) allowing the migrating dispersed phase to accumulate within a region of said phase mixture adjacent to a dispersed phase collector surface in contact with said phase mixture.

2. A method as claimed in claim 1, wherein the migrating dispersed phase is allowed to form accumulations on the inner wall surface of a vessel containing said body of said phase mixture.

3. A method as claimed in claim 2, wherein the free charge is introduced into a stream of said mixture, at least predominantly by field emission, and the charged stream is passed through a gas or vapor space, before entering said vessel, for minimising charge dissipation from the charged phase mixture in said vessel back to where the free charge introduction took place.

4. A method as claimed in claim 3, wherein said gas space is enclosed and the enclosed space is pressurized.

5. A method as claimed in claim 3, wherein said gas space is enclosed and a purge gas is flowed through said gas space.

6. A method as claimed in claim 5, wherein the mixture is recycled and, during the recycling, steps (a) and (b) are repeated on the mixture to increase the overall dispersed phase separation efficiency.

7. A method as claimed in claim 1, wherein the dispersed phase comprises solid particles.

8. A method for use in the separation of a dispersed phase from a continuous liquid phase, the phases together forming a phase mixture, by producing migration of dispersed phase within the phase mixture, said method comprising the steps of:

(a) introducing free charge that is net unipolar into the phase mixture in such manner as to cause the continuous phase to act as a medium through which volumetric distribution of the introduced charge takes place by charge motion relative to the continuous liquid phase;

(b) passing the charged phase mixture into a dispersed phase collection region in which charged phase mixture and a dispersed phase collector surface are brought into contact with one another, the charged phase mixture, before entering said collection region, being directed as a stream through a gas or vapor space for minimizing charge dissipation from the charged phase mixture in said collection region back to where the free charge introduction took place, there being a sufficient excess of free charge introduced such that the volumetric charge distribution causes, in said collection region, an electric field to be induced in the phase mixture and the dispersed phase to become charged, and the induced electric field and the charge on the dispersed phase interact to produce an electrical driving force acting on the dispersed phase so that said migration is due substantially to said driving force; and (c) allowing the migrating dispersed phase to accumulate within said dispersed phase collection region adjacent to said collector surface.

9. A method according to claim 8, wherein the gas or vapor space is enclosed and a purge gas is flowed through said gas space.

10. A method according to claim 8, wherein, throughout a predetermined period, the phase mixture is continuously recycled back from a region, which is relatively free of dispersed phase, in the dispersed phase collection region and steps (a) and (b) are repeated to increase the overall dispersed phase separation efficiency.

11. A method of separating a dispersed phase from a continuous liquid phase, the phases together forming a liquid phase mixture, by producing migration of dispersed phase within the phase mixture, said method comprising the steps of:

(a) flowing a stream of the phase mixture past a pointed high potential electrode at sufficient velocity that free charge that is net unipolar is injected by field emission into the liquid mixture and is conveyed by the flowing stream away from the high potential electrode, the free charge being injected into the phase mixture stream in such manner as to cause the continuous phase to act as a medium through which volumetric distribution of the injected charge occurs by charge motion relative to the continuous liquid phase;

(b) causing the charged stream to enter into a separation vessel through a gas or vapor space for minimising charge dissipation from the charged phase mixture in the separation vessel back to where the free charge introduction took place, there being an excess of free charge introduced such that the volumetric charge distribution causes an electric field to be induced in the mixture in the vessel and the dispersed phase there to become charged, and the induced electric field and the charge on the dispersed phase interact to produce an electrical driving force acting on the dispersed phase so that said migration is due substantially to said driving force; and (c) maintaining the liquid mixture in the vessel for sufficient time for dispersed phase to migrate to the internal wall surfaces of said separation vessel and accumulate in contact with those wall surfaces.

12. A method according to claim 11, wherein said separation vessel is, periodically, at least partially emptied of liquid phase which is relatively free of dispersed phase.

13. A method according to claim 11, wherein the level of the liquid mixture in the separation vessel is monitored and the rate of supply of phase mixture into which the free charge is injected is regulated according to the monitored phase mixture level, so as to maintain said level in the separation vessel substantially constant.

14. Apparatus for use in the separation of a dispersed phase from a continuous liquid phase, the phases together forming a phase mixture, by producing migration of dispersed phase within the phase mixture, said apparatus comprising:

(a) means arranged to introduce free charge that is net unipolar into the phase mixture in such manner as to cause the continuous phase to act as a medium through which volumetric distribution of the introduced charge takes place by charge motion relative to the continuous liquid phase;

(b) a dispersed phase separator comprising:
  (i) a collector surface for dispersed phase; and
  (ii) means defining a dispersed phase collection region in which, in use of said apparatus, phase mixture, charged by the free charge introducing means, and said collector surface are brought into contact with one another; and (c) a gas or vapor space which separates the dispersed phase collection region from the free charge introducing means and through which the free charge introducing means is arranged to direct a stream of charged phase mixture before entering said collection region, for minimising charge dissipation from the charged phase mixture in said collection region back to the free charge introducing means, said free charge introducing means being arranged to introduce a sufficient excess of free charge such that the volumetric charge distribution causes, in said collection region, an electric field to be induced in the phase mixture and the dispersed phase to become charged, and the induced electric field and the charge on the dispersed phase interact to produce an electrical driving force acting on the dispersed phase so that said migration is due substantially to said driving force, the dispersed phase migration causing dispersed phase to accumulate within said dispersed phase collection region adjacent said collector surface.

15. Apparatus according to claim 14, wherein said means defining said dispersed phase collection region comprises a vessel having a base and a top and said free charge introducing means is positioned spaced away from the vessel top and arranged to direct said stream of charged phase mixture into said vessel through an opening in the top thereof.

16. Apparatus as claimed in claim 15, wherein the free charge introducing means comprises a charge injector and wherein the charge injector and said vessel constitute individual stages of the separation apparatus separated by said gas or vapor space, there being means for recycling the phase mixture back from a region, which is relatively free of dispersed phase, in the dispersed phase separation region and through the free charge introducing means again.

17. Apparatus as claimed in claim 16, wherein an outlet in the vessel is connected to the free charge introducing means through a pump for recycling the phase mixture.

18. Apparatus as claimed in claim 14, wherein the gas space is enclosed and means are provided for flowing a purge gas through said enclosed space.

19. Apparatus as claimed in claim 14, wherein said gas space is pressurised.

20. Apparatus as claimed in claim 14, wherein said gas space is exposed to the ambient atmosphere.

21. Apparatus as claimed in claim 14, wherein the free charge introducing means comprises a charge injector arranged to inject free charge, at least predominantly by field emission, into the phase mixture.

22. Apparatus for use in separating a dispersed phase from a continuous liquid phase, the phases together forming a liquid phase mixture, by producing migration of dispersed phase within the phase mixture, said apparatus comprising a charge injector including a pointed high potential electrode; means for flowing a stream of said phase mixture past said electrode at sufficient velocity that free charge that is net unipolar is injected by field emission into the liquid phase mixture and is conveyed by the flowing stream away from the high potential electrode, the charge injector being arranged to inject the free charge into the phase mixture stream in such manner as to cause the continuous phase to act as a medium through which volumetric distribution of the injected charge occurs by charge motion relative to the continuous liquid phase; a separation vessel into which the charge injector is arranged to pass the charged stream through a gas or vapor space, between the charge injector and separation vessel, the gas or vapor space serving to minimise charge dissipation from the charged phase mixture in the separation vessel back to the charge injector, the charge injector being arranged to inject an excess of free charge into the phase mixture such that the volumetric charge distribution causes an electric field to be induced in the phase mixture in the vessel and the dispersed phase there to be charged, and the induced electric field and the charge on the dispersed phase interact to produce an electric driving force acting on the dispersed phase so that said migration is due substantially to said driving force, and means operable or operative to maintain the liquid mixture in the vessel for sufficient time for dispersed phase to migrate to the internal wall surfaces of said separation vessel and accumulate in contact with those wall surfaces.

23. Apparatus according to claim 22, wherein an outlet in the separation vessel is connected to the charge injector through a pump for recycling phase mixture in a region, which is relatively free of dispersed phase, in said vessel back through the charge injector.

24. Apparatus according to claim 22, wherein the vessel is provided with valve means which are operable for at least partially emptying the vessel of clarified liquid phase.

25. Apparatus according to claim 24, wherein the vessel is provided with means responsive to the level of the body of liquid phase mixture in the separation vessel for regulating the rate of supply of phase mixture to be treated to the charge injector means so as to maintain said level substantially constant.

26. Apparatus as claimed in claim 22, wherein the gas or vapor space is enclosed and means are provided for pressurising said enclosed space.

27. Apparatus as claimed in claim 22, wherein the gas or vapor space is enclosed and means are provided for flowing a purge gas through said enclosed space.

28. Apparatus as claimed in claim 22, wherein said space is in communication with ambient atmosphere.

* * * * *